US011489946B2

(12) United States Patent
Schelstraete

(10) Patent No.: US 11,489,946 B2
(45) Date of Patent: Nov. 1, 2022

(54) WIRELESS PREAMBLE DESIGN

(71) Applicant: SEMICONDUCTOR COMPONENTS INDUSTRIES, LLC, Phoenix, AZ (US)

(72) Inventor: Sigurd Schelstraete, Menlo Park, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 24 days.

(21) Appl. No.: 17/104,288

(22) Filed: Nov. 25, 2020

(65) Prior Publication Data

US 2021/0185154 A1 Jun. 17, 2021

Related U.S. Application Data

(60) Provisional application No. 62/948,575, filed on Dec. 16, 2019.

(51) Int. Cl.
*H04L 69/18* (2022.01)
*H04W 28/04* (2009.01)
(Continued)

(52) U.S. Cl.
CPC .............. *H04L 69/18* (2013.01); *H04L 69/22* (2013.01); *H04W 28/04* (2013.01); *H04W 52/0216* (2013.01)

(58) Field of Classification Search
CPC .................................................... H04W 84/12
See application file for complete search history.

(56) References Cited

U.S. PATENT DOCUMENTS

2006/0067263 A1* 3/2006 Li ........................ H04B 7/0802
370/315
2011/0194475 A1* 8/2011 Kim ...................... H04L 1/0088
370/311
(Continued)

FOREIGN PATENT DOCUMENTS

WO WO-2020052784 A1 * 3/2020 ............. H04L 5/001

OTHER PUBLICATIONS

Sun, Preamble Design Consideration for 11be follow-up, InterDigital, IEEE 802.11-19/1569r1 Sep. 2019.
(Continued)

Primary Examiner — Jamaal Henson
(74) Attorney, Agent, or Firm — Maschoff Brennan

(57) ABSTRACT

A method includes building a wireless packet that includes a preamble that is compliant with a first wireless communication protocol and is forward compatible with a second wireless communication protocol that is different than the first wireless communication protocol. Building the wireless packet includes building the preamble with a first subset of bits that are specified in both the first wireless communication protocol and the second wireless communication protocol, the first subset of bits including one or more media access control (MAC) layer characteristics. Building the wireless packet includes building the preamble with a second subset of bits that are specified in the first wireless communication protocol exclusive of the second wireless communication protocol. The method further includes transmitting the wireless packet to one or more receiver nodes.

15 Claims, 8 Drawing Sheets

(51) Int. Cl.
*H04W 52/02* (2009.01)
*H04L 69/22* (2022.01)

(56) References Cited

U.S. PATENT DOCUMENTS

| | | | | |
|---|---|---|---|---|
| 2016/0143058 | A1* | 5/2016 | Son | H04W 74/0816 370/329 |
| 2016/0262052 | A1* | 9/2016 | Kim | H04L 1/201 |
| 2017/0187848 | A1* | 6/2017 | Itagaki | H04W 80/02 |
| 2017/0324522 | A1* | 11/2017 | Porat | H04L 5/003 |
| 2019/0097768 | A1* | 3/2019 | Porat | H04L 5/003 |
| 2019/0097850 | A1* | 3/2019 | Kenney | H04L 27/2613 |
| 2019/0124556 | A1* | 4/2019 | Verma | H04W 72/042 |
| 2019/0141570 | A1* | 5/2019 | Verma | H04L 5/0007 |
| 2019/0373586 | A1* | 12/2019 | Verma | H04B 7/0697 |
| 2020/0076552 | A1* | 3/2020 | Cherian | H04W 72/044 |
| 2020/0112408 | A1* | 4/2020 | Verma | H04B 7/0452 |
| 2020/0127681 | A1* | 4/2020 | Verma | H04L 1/0079 |
| 2020/0136884 | A1* | 4/2020 | Park | H04L 27/2663 |
| 2020/0213933 | A1* | 7/2020 | Patil | H04W 80/08 |
| 2020/0228380 | A1* | 7/2020 | Yang | H04L 27/2657 |
| 2020/0382998 | A1* | 12/2020 | Cao | H04L 1/0041 |
| 2021/0051664 | A1* | 2/2021 | Bhattacharya | H04L 1/203 |
| 2021/0273838 | A1* | 9/2021 | Park | H04L 27/2607 |

OTHER PUBLICATIONS

Vermani, Forward Compatibility for WiFi Preamble Design, Qualcomm, IEEE 802.11-19/1519r5, Sep. 2019.
Lim, Further discussion for 11be preamble, LG Electronics, IEEE 802.11-19/1486r9, Nov. 11, 2019.
Chen, 11be Preamble Structure, Intel, IEEE 802.11-19/1516r4, Sep. 15, 2019.
Cao, EHT Preamble Design, Marvell, IEEE 802.11-19/1540r7, Nov. 11, 2019.
Vermani, Further Ideas on EHT Preamble Design, Qualcomm, IEEE 802.11-19/1870r4, Nov. 11, 2019.

* cited by examiner

WIRELESS PREAMBLE DESIGN

CROSS-REFERENCE TO RELATED APPLICATION

This patent application claims the benefit of and priority to U.S. Provisional App. No. 62/948,575 filed Dec. 16, 2019 titled "Wi-Fi PREAMBLE DESIGN," which is incorporated in the present disclosure by reference in its entirety.

FIELD

The implementations discussed herein relate to a wireless preamble design.

BACKGROUND

Unless otherwise indicated in the present disclosure, the materials described in the present disclosure are not prior art to the claims in the present application and are not admitted to be prior art by inclusion in this section.

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

The Institute of Electrical and Electronics Engineers (IEEE) has defined or is in the process of defining various wireless communication standards or protocols, including the IEEE 802.11 protocols. Examples include the IEEE 802.11a, 802.11b, 802.11b, 802.11n, 802.11ac, 802.11ad, and 802.11ax protocols as well as the latest protocol that is currently under development, e.g., the IEEE 802.11be protocol.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an implementation, a method includes building a wireless packet that includes a preamble that is compliant with a first wireless communication protocol and is forward compatible with a second wireless communication protocol that is different than the first wireless communication protocol. Building the wireless packet includes building the preamble with a first subset of bits that are specified in both the first wireless communication protocol and the second wireless communication protocol, the first subset of bits including one or more media access control (MAC) layer characteristics. Building the wireless packet includes building the preamble with a second subset of bits that are specified in the first wireless communication protocol exclusive of the second wireless communication protocol. The method further includes transmitting the wireless packet to one or more receiver nodes.

In another implementation, a non-transitory computer-readable storage medium has computer-readable instructions stored thereon that are executable by a processor device to perform or control performance of operations. The operations include building a wireless packet that includes a preamble that is compliant with a first wireless communication protocol and is forward compatible with a second wireless communication protocol that is different than the first wireless communication protocol. Building the wireless packet includes building the preamble with a first subset of bits that are specified in both the first wireless communication protocol and the second wireless communication protocol, the first subset of bits including one or more MAC layer characteristics. Building the wireless packet includes building the preamble with a second subset of bits that are specified in the first wireless communication protocol exclusive of the second wireless communication protocol. The operations further include transmitting the wireless packet to one or more receiver nodes.

In another implementation, a sender node for wireless communication with a receiver node in a wireless network includes a memory and a processor. The processor is coupled to the memory, the processor to perform or control performance of operations. The operations include building a wireless packet that includes a preamble that is compliant with a first wireless communication protocol and is forward compatible with a second wireless communication protocol that is different than the first wireless communication protocol. Building the wireless packet includes building the preamble with a first subset of bits that are specified in both the first wireless communication protocol and the second wireless communication protocol, the first subset of bits including one or more MAC layer characteristics. Building the wireless packet includes building the preamble with a second subset of bits that are specified in the first wireless communication protocol exclusive of the second wireless communication protocol. The operations further include transmitting the wireless packet to one or more receiver nodes.

BRIEF DESCRIPTION OF THE DRAWINGS

Example implementations will be described and explained with additional specificity and detail through the use of the accompanying drawings in which.

DETAILED DESCRIPTION

Figure 1:
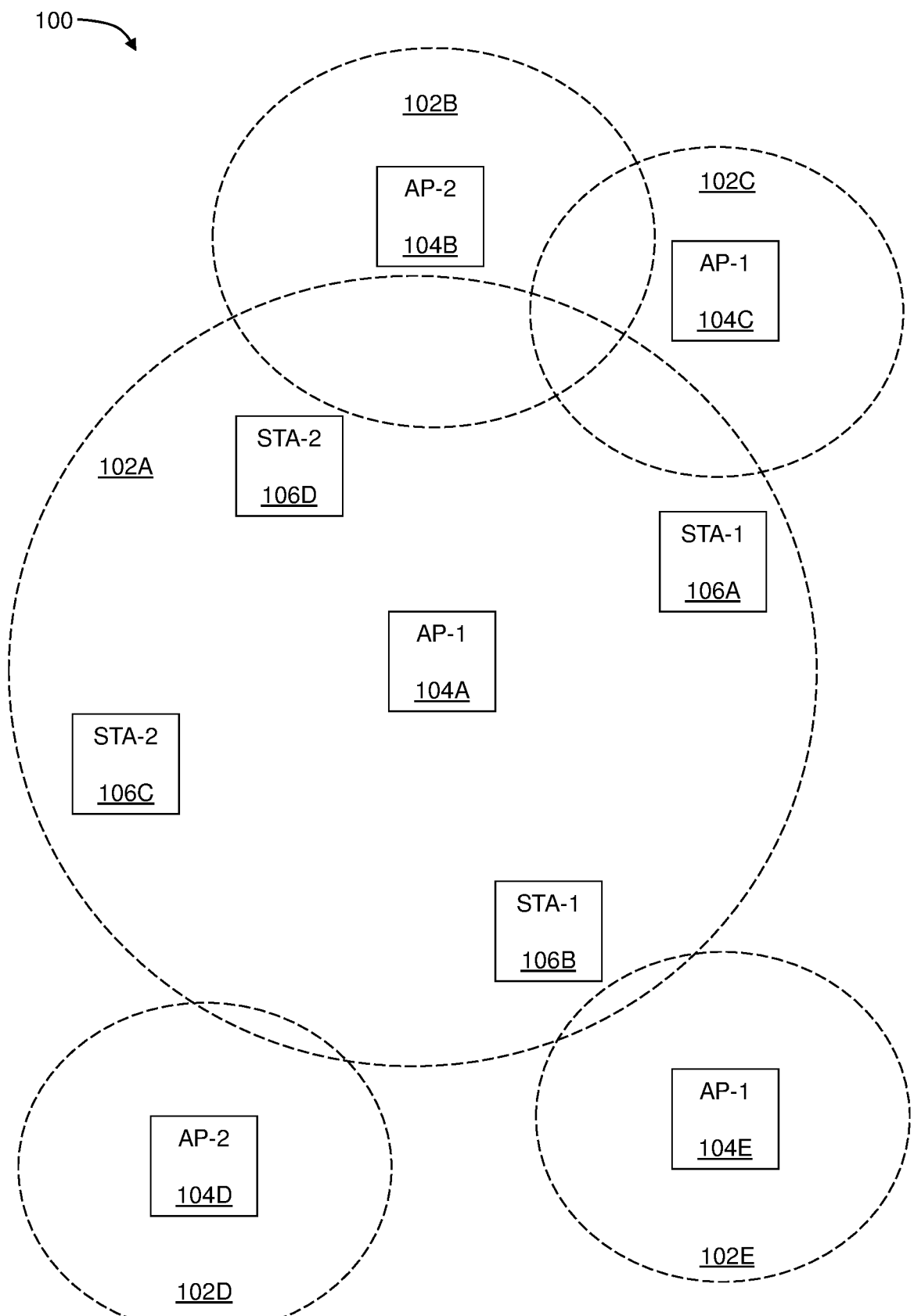
FIG. 1 illustrates an example WLAN in which one or more examples described herein may be implemented.

When new wireless communication protocols are developed, it can be useful to design packet preambles in such a way that at least some information in the preamble of the new protocol, or "first protocol", can be accessed by devices that may not fully understand or be compliant with the first protocol. For example, it may be desirable for 802.11ax wireless devices or more generally devices of an earlier protocol, or "second protocol", to access and/or process at least some of a preamble of the first protocol. The first protocol may include a proprietary protocol, the IEEE 802.11be protocol, a modified version of the IEEE 802.11be protocol, or other protocol that is developed later than the second protocol. This may permit wireless devices of the second protocol to extract some useful information from the preamble of the first protocol without entirely understanding the preamble format of the first protocol.

Some implementations described herein relate to such a first protocol. The first protocol includes a preamble with version independent bits, or bits that are common to both the first protocol and a second protocol, and version dependent bits, or bits that are exclusive to the first protocol. The inclusion of the version independent bits in the preamble of the first protocol allows wireless devices of the second protocol to access and/or process at least the version independent bits, such that the wireless devices of the second protocol may extract some useful information from the preamble of the first protocol. The inclusion of the version dependent bits in the preamble of the first protocol allows wireless devices of the first protocol to implement features that may not be supported or understood by devices of the second protocol.

The version independent bits may include one or more MAC layer characteristics, such as basic service set (BSS) color or reserved transmit opportunity (TXOP).

The preamble of the first protocol may at least partially imitate a preamble of the second protocol. In general, a preamble of one protocol may at least partially imitate a preamble of another protocol if the preamble of the protocol includes at least a subset of fields and/or bit positions that conform to, are the same as, and/or match a corresponding subset of fields and/or bit positions of the other protocol. For example, the version independent bits may be included in one or more bit locations or fields of the preamble that match corresponding bits or fields in the preamble of the second protocol so that wireless devices of the second protocol identify the preamble as the preamble of the second protocol. However, version dependent bits may be included in one or more bit locations or fields of the preamble that are not considered by the wireless devices of the earlier protocol in determining whether the preamble is of the second protocol.

The preamble of the first protocol may at least partially imitate a preamble of a trigger-based (TB) wireless packet of the second protocol which may be generated by a sender responsive to receiving a trigger frame of the second protocol. As such, the preamble of the wireless packet may look like a preamble of a TB wireless packet. In general, a preamble of a wireless packet that is not a TB wireless packet may be considered to look like a preamble of a TB wireless packet if the preamble includes at least a subset of fields and/or bit positions that conform to, are the same as, and/or match a corresponding subset of fields and/or bit positions of preambles of TB wireless packets. When a wireless packet that looks like a TB wireless packet is preceded by a trigger frame at a device of the first protocol, the device of the first protocol may process the wireless packet as a TB wireless packet according to the second protocol. On the other hand, when the wireless packet is not preceded at the device of the first protocol by a trigger frame, the device of the first protocol may at least initially process the wireless packet as a wireless packet of the first protocol and may keep or drop the wireless packet depending on whether it is confirmed as being of the first protocol.

When a wireless packet that looks like a TB wireless packet is preceded by a trigger frame at a device of the second protocol, the device of the second protocol may process the wireless packet as a TB wireless packet according to the second protocol. On the other hand, when the wireless packet is not preceded at the device of the second protocol by a trigger frame, the device of the second protocol may still extract some information from the preamble (e.g., one or more MAC layer characteristics) and exit processing of the wireless packet.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1 illustrates an example WLAN 100 in which one or more examples described herein may be implemented. The WLAN 100 may generally include a basic service set (BSS) 102A that includes an access point (AP) 104A that implements a first wireless communication protocol (hereinafter "first protocol") and one or more wireless stations (STAs) 106A, 106B, 106C, 106D (hereinafter collectively STAs 106 or generically STA 106) that each implements the first protocol or a second wireless communication protocol (hereinafter "second protocol"). The first protocol may include a later protocol and the second protocol may include an earlier protocol. The number in the name of each device in FIG. 1 designates the corresponding protocol implemented by the device. For example, the AP 104A is labeled "AP-1" and each of the STAs 106A, 106B is labeled "STA-1" indicating that each of the AP 104A and the STAs 106A, 106B implements the first protocol, while each of the STAs 106C, 106D is labeled "STA-2" indicating that each of the STAs 106C, 106D implements the second protocol.

The WLAN 100 may additionally include one or more other BSSs 102B, 102C, 102D, 102E, each of which includes a corresponding AP 104B, 104C, 104D, 104E and one or more STAs (not shown in FIG. 1). As indicated in FIG. 1, each of the APs 104B, 104D implements the second protocol while each of the APs 104C, 104E implements the first protocol.

Each of the APs 104A, 104B, 104C, 104D, 104E (hereinafter collectively APs 104 and generically AP 104) may include a gateway, a repeater, a mesh node, and/or other suitable AP. Each AP 104 may connect to the Internet and/or a core network via a bridge, a backhaul link, a base station, and/or other suitable devices or connections.

Each of the STAs 106 in each of the BSSs 102A, 102B, 102C, 102D, 102E (hereinafter collectively BSSs 102 or generically BSS 102) may include a desktop computer, a laptop computer, a tablet computer, a mobile phone, a smartphone, a printer, a smart television, a digital video disc (DVD) player, a security camera, a smart device, or any other device configured for wireless communication.

In these and other implementations, each of the APs 104 and STAs 104 may implement one or more of the IEEE 802.11 protocols or other wireless communication protocols. The frequency range of each communication channel and/or other features are specified in the corresponding one of the IEEE 802.11 protocols being implemented, e.g. "a", "b", "g", "n", "ac", "ad", "ax" or other communication protocol.

In the example of FIG. 1, each of the APs 104A, 104C, 104E and the STAs 106A, 106B implement the first protocol while each of the APs 104B, 104D and the STAs 106C, 106D implement the second protocol. In general, the first and second protocols may include different wireless communication protocols where the first protocol is forward compatible with the second protocol such that devices that implement the second protocol may at least partially understand wireless packets sent by devices that implement the first protocol. Wireless packets according to the first protocol may additionally include at least some features that are not understandable by devices that implement the second protocol. In an example, the second protocol includes the IEEE 802.11ax communication protocol and the first protocol includes the IEEE 802.11be communication protocol (or modified version thereof) and/or a proprietary communication protocol.

As used herein, a first, often newer, protocol is forward compatible with a second, often older, protocol if devices that implement the first protocol can do at least some limited communication with devices that implement the second protocol, without either requiring the first protocol devices to fully fall back to the second protocol or for the second protocol devices to be upgraded to the first protocol. Thus, forward compatibility or upward compatibility is a design characteristic that may allow a system or device to accept input intended for later versions of itself.

Within the WLAN 100, there may be coverage overlap between one or more of the BSSs 102, e.g., as illustrated in FIG. 1. As a result of the overlapping coverage, wireless packets within a given one of the BSSs 102 may be inadvertently transmitted to and received by an AP 104 or STA 106 in a different one of the BSSs 102. Accordingly, the IEEE 802.11ax communication protocol implements BSS color as a feature of the protocol. BSS color may be used by wireless devices to identify and distinguish between overlapping BSSs (OBSSs) and may be included in 802.11ax preambles. For example, wireless packets exchanged between the AP 104A and any of STAs 106 in the BSS 102A may include a BSS color that identifies the BSS 102A. If any of the other BSSs 102B-102E overlap the BSS 102A and transmit wireless packets on a same channel as the BSS 102A, the wireless devices within the BSS 102A can distinguish between wireless packets of the BSS 102A and wireless packets of the other BSSs 102B-102E based on the BSS color included in the preambles of the wireless packets.

The IEEE 802.11ax protocol includes multiple types of wireless packets, such as single user (SU), multi user (MU), and TB. TB wireless packets are transmitted by a wireless device, e.g., a STA, in response to receiving a trigger frame from another wireless device, e.g., an AP, that specifies what the STA should include in the TB wireless packet. For example, the APs 104B, 104D may send trigger frames to 802.11ax STAs in their respective BSS 102B, 102D, in response to which the 802.11ax STAs may transmit TB wireless packets to the APs 104B, 104D.

Various IEEE 802.11ax protocol wireless packets, such as TB wireless packets include BSS color, reserved transmit opportunity (TXOP), spatial reuse fields, and other information that APs 104 may use to control or optimize performance of their respective BSS 102. When APs 104 that understand the IEEE 802.11ax protocol receive TB wireless packets, they may extract and use the BSS color and TXOP whether or not the AP 104 receives the trigger frame that preceded the TB wireless packet. However, some of the information in the TB wireless packet (e.g., spatial reuse information) may not be useful or meaningful to the APs 104 if the APs 104 did not receive the trigger frame that preceded the TB wireless packet.

For example, suppose the AP 104A in the BSS 102A receives a TB wireless packet from one of the STAs in the overlapping BSS 102B, but the AP 104A does not receive the trigger frame sent by the AP 104B that preceded the TB wireless packet. In this case, the AP 104B may be referred to as a hidden node AP with respect to the AP 104A since the AP 104A does not hear the transmission from the AP 104B. Since the AP 104A does not receive the trigger frame sent by the AP 104B, the AP 104A may be unable to understand or use all the information in the TB wireless packet from the STA in the overlapping BSS 102B.

Figure 2:
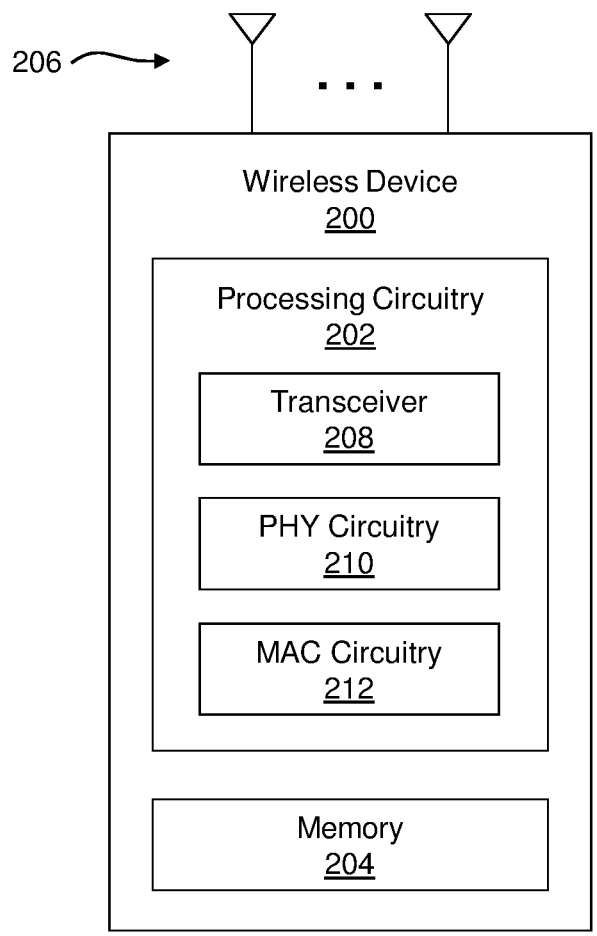
FIG. 2 illustrates an example wireless device in which one or more examples described herein may be implemented.

FIG. 2 illustrates an example wireless device 200 in which one or more examples described herein may be implemented. The wireless device 200 may include, be included in, or correspond to any of the APs 104 or STAs 106 of FIG. 1 or other APs, STAs, or wireless devices described herein. In general, the wireless device 200 may be configured to decode and/or encode signals, packets, and/or frames as described herein, which signals, packets, or frames may be referred to as Physical (PHY) layer protocol data units (PPDUs).

The wireless device 200 may include processing circuitry 202 and memory 204 and may further include or be coupled to one or more antennas 206. The processing circuitry 202 may include a transceiver 208, PHY layer circuitry (PHY circuitry) 210, and MAC layer circuitry (MAC circuitry) 212, one or more of which may enable transmission and reception of signals to and from other wireless devices using the one or more antennas 206. As an example, the PHY circuitry 210 may perform various encoding and decoding functions that may include formation of baseband signals for transmission and decoding of received signals. As another example, the transceiver 208 may perform various transmission and reception functions such as conversion of signals between a baseband range and a Radio Frequency (RF) range.

Accordingly, the PHY circuitry 210 and the transceiver 208 may be separate components or may be part of a combined component, e.g., processing circuitry 202. In addition, some of the described functionality related to transmission and reception of signals may be performed by a combination that may include one, any, or all of the PHY circuitry 210 the transceiver 208, the MAC circuitry 212, the memory 210, and other components or layers. The MAC circuitry 212 may control access to a wireless medium. The wireless device 200 may also include memory 210 arranged to perform the operations described herein, e.g., some of the operations described herein may be performed by execution of instructions stored in the memory 210.

The one or more antennas 206 may include one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 206 may be effectively separated to take advantage of spatial diversity and different channel characteristics that may result.

One or more of the memory 210, the transceiver 208, the PHY circuitry 210, the MAC circuitry 212, the antennas 206, and/or the processing circuitry 202 may be coupled with one another. Moreover, although the memory 210, the transceiver 208, the PHY circuitry 210, the MAC circuitry 212, and the antennas 206 are illustrated as separate components, one or more of the memory 210, the transceiver 208, the PHY circuitry 210, the MAC circuitry 212, and/or the antennas 206 may be integrated in an electronic package or chip.

In some implementations, the MAC circuitry 212 may be arranged to contend for a wireless medium during a contention period to receive control of the medium for a TXOP and encode or decode a PPDU. In some implementations, the MAC circuitry 212 may be arranged to contend for the wireless medium based on channel contention settings, a transmitting power level, a clear channel assessment level (e.g., an energy detect level), or other information.

The PHY circuitry 210 may be arranged to transmit signals in accordance with one or more communication protocols described herein. For example, the PHY circuitry 210 may be configured to transmit PPDUs according to one or more of the IEEE 802.11 communication protocols. The PHY circuitry 210 may include circuitry for modulation/demodulation, upconversion/downconversion, filtering, amplification, or the like. In some implementations, the processing circuitry 202 may include one or more processors. The processing circuitry 202 may be configured to perform functions based on instructions stored in the memory 204 or other computer-readable storage medium (e.g., random access memory (RAM), read-only memory (ROM), or other storage medium), or based on special purpose circuitry. The processing circuitry 202 may include a processor such as a general purpose processor or special purpose processor. The processor, whether included in the processing circuitry 202 or apart therefrom, may execute the instructions to perform or control performance of one or more of the operations described herein. The processing circuitry 202 may implement one or more functions associated with the antennas 206, the transceiver 208, the PHY circuitry 210, the MAC circuitry 212, and/or the memory 210. In some implementations, the processing circuitry 202 may be configured to perform one or more of the functions/operations and/or methods described herein.

Figure 3:
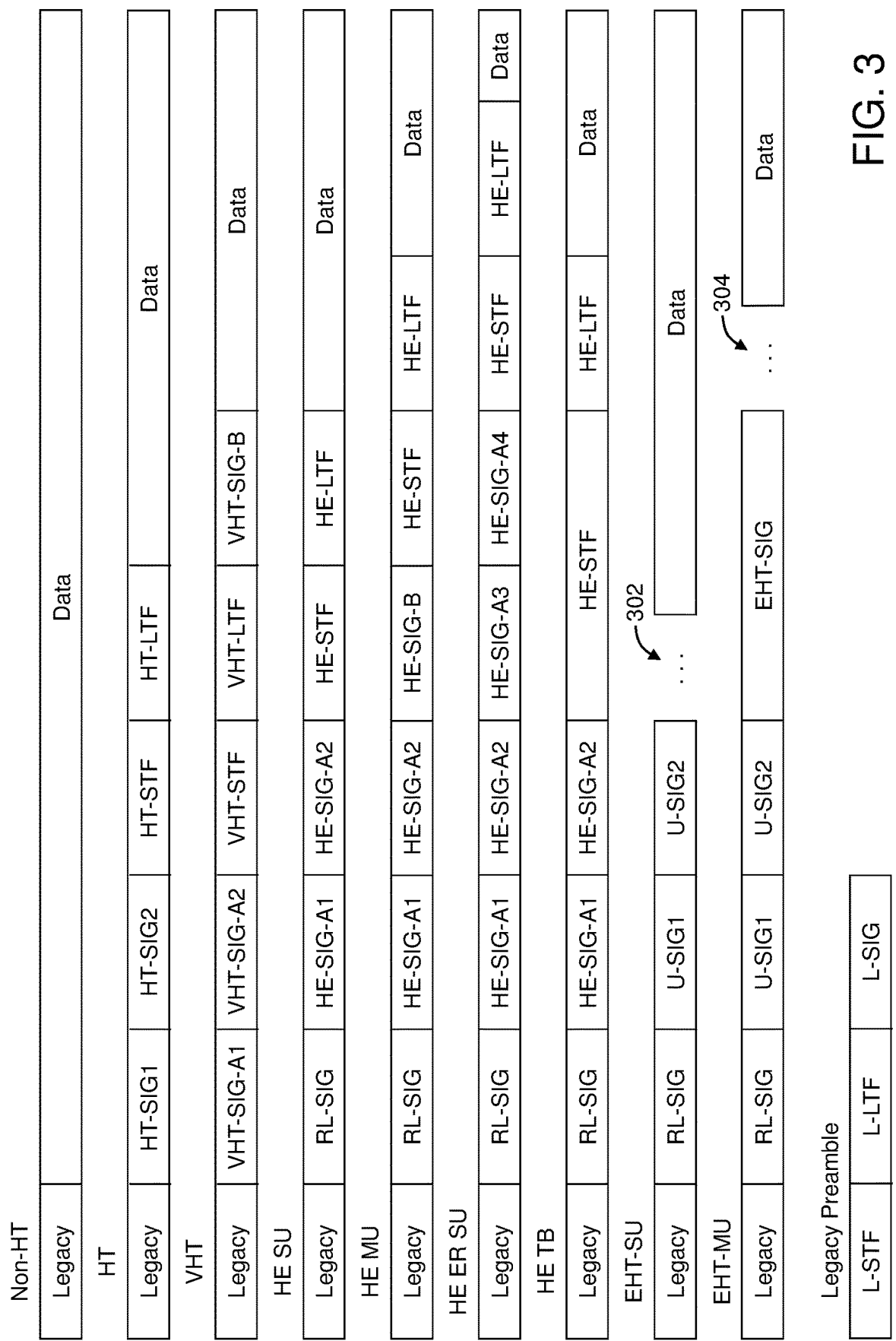
FIG. 3 illustrates various wireless packets according to various wireless communication protocols.

FIG. 3 illustrates various wireless packets according to various wireless communication protocols. Wireless packets such as illustrated in FIG. 3 may be referred to as PPDUs, each of which includes a payload or data preceded by a preamble according to a corresponding wireless communication protocol. The preambles of all the PPDUs in FIG. 3 begin with a legacy preamble ("Legacy" in FIG. 3), which as shown at the bottom of FIG. 3 may include a legacy short training field (L-STF), a legacy long training field (L-LTF), and a legacy signal field (L-SIG).

The top or first PPDU is a non-high throughput (non-HT) PPDU according to various IEEE 802.11 communication protocols that precede the IEEE 802.11n communication protocol. The non-HT PPDU includes the legacy preamble and data.

The next PPDU is a high throughput (HT) PPDU according to the IEEE 802.11n communication protocol. After the legacy preamble, the HT PPDU additionally includes HT signal fields (HT-SIG1 and HT-SIG2), an HT short training field (HT-STF), an HT long training field (HT-LTF), and data.

The next PPDU is a very high throughput (VHT) PPDU according to the IEEE 802.11ac communication protocol. After the legacy preamble, the VHT PPDU additionally includes VHT signal A fields (VHT-SIG-A1 and VHT-SIG-A2), a VHT short training field (VHT-STF), a VHT long training field (VHT-LTF), a VHT signal B field (VHT-SIG-B), and data.

The next four PPDUs are high efficiency (HE) PPDUs according to the IEEE 802.11ax communication protocol and specifically include an HE single user (HE SU) PPDU, an HE multi user (HE MU) PPDU, an HE extended range single user (HE ER SU) PPDU, and an HE TB PPDU. After the legacy preamble, each of the four HE PPDUs includes a Repeated L-SIG (RL-SIG), one or more HE signal A fields (HE-SIG-A1, HE-SIG-A2), an HE short training field (HE-STF), an HE long training field (HE-LTF), and data. The HE MU PPDU additionally includes an HE signal B field (HE-SIG-B). The HE ER SU PPDU includes additional HE signal A fields (HE-SIG-A3, HE-SIG-A4). The IEEE 802.11ax communication protocol associated with the HE PPDUs of FIG. 3 is an example of the second protocol described with respect to FIG. 1.

The last two PPDUs are example extremely high throughput (EHT) PPDUs according to an implementation of the IEEE 802.11be communication protocol or a proprietary wireless communication protocol. The EHT PPDUs include an EHT single user (EHT-SU) PPDU and an EHT multi user (EHT-MU) PPDU. After the legacy preamble, each of the two EHT PPDUs includes a RL-SIG, one or more other fields such as one or more universal signal fields (U-SIG1, U-SIG2), one or more other preamble fields designated by ellipses at 302, 304 (hereinafter preamble fields 302, 304), and data. The implementation of the 802.11be communication protocol or the proprietary wireless communication protocol associated with the EHT PPDUs of FIG. 3 is each an example of the first protocol described with respect to FIG. 1.

Information in the preambles may be used to identify a type of the PPDU so that the PPDU may be processed appropriately upon receipt. In some implementations, the L-SIG of the legacy preamble may be used alone or in combination with other information in the preamble of a given PPDU to identify the PPDU type. For example, the L-SIG of the legacy preamble may include a length field that may be set to mod(LENGH, 3)=0 to designate a VHT PPDU, to mod(LENGTH, 3)=1 to designate an HE SU PPDU or HE TB PPDU, or to mod(LENGTH, 3)=2 to designate an HE MU PPDU or HE ER SU PPDU.

Where the length field of L-SIG indicates two (or more) possible types of PPDUs, other information in the preamble of the given PPDU may be used to differentiate between the two (or more) possibilities. For example, when two reserved bits in the HE-SIG-A1 field have values of 0 and 1, this information combined with mod(LENGTH, 3)=1 in the length field of L-SIG may designate the PPDU as an HE TB PPDU, thereby distinguishing it from an HE SU PPDU.

As already indicated, the IEEE 802.11ax communication protocol implements BSS color as a feature of the protocol. BSS color may be used by wireless devices to identify and distinguish between OBSSs and may be included in 802.11ax preambles such as in the preambles of the HE PPDUs of FIG. 3. Referring to FIG. 1, if any of the BSSs 102B-102E overlap the BSS 102A and transmit PPDUs on a same channel as the BSS 102A, the wireless devices within the BSS 102A can distinguish between PPDUs of the BSS 102A and PPDUs of the other BSSs 102B-102E based on the BSS color included in the preambles of the PPDUs.

The IEEE 802.11ax communication protocol additionally implements TXOP as a feature of the protocol. The TXOP is a bounded time interval during which a wireless device can send as many frames as possible (as long as the duration of the transmission does not extend beyond the maximum duration of the TXOP). The TXOP may be included in 802.11ax preambles such as in the preambles of the HE PPDUs of FIG. 3.

BSS color and TXOP are both MAC layer characteristics of WLANs. For example, referring to FIG. 2, the MAC circuitry 212 of the wireless device 200 may include BSS color and TXOP in outgoing PPDUs and/or may receive and understand BSS color and TXOP from incoming PPDUs and/or may implement or use BSS color and TXOP in one or more algorithms.

When wireless devices receive PPDUs that include BSS color and TXOP, the BSS color and TXOP may be useful to the wireless devices even if the wireless devices are not the intended targets/recipients of the PPDUs. For example, if a wireless device receives a PPDU that is not intended for the wireless device and the wireless device extracts the TXOP from the PPDU, the wireless device may enter a sleep state or power save mode for the duration of the TXOP. In this example, since a shared communication medium is reserved by the TXOP for a bounded time interval to send packets not intended for the wireless device, the wireless device can expect to not receive any PPDUs intended for it during the TXOP and therefore does not need to be on during the TXOP. BSS color and/or TXOP may be used by wireless devices (whether intended or unintended recipients) in this or other algorithms.

When new wireless communication protocols are developed, it can be useful to design packet preambles in such a way that at least some information in the preamble of the new protocol can be accessed by wireless devices that may not fully understand or be compliant with the new protocol. For instance, it may be desirable for a 802.11ax wireless devices to be able to process a preamble of a later protocol, such as a proprietary protocol or the IEEE 802.11be protocol, and extract information, such as BSS color and TXOP, from the preamble without entirely understanding the preamble format of the later protocol. Processing the preamble of a later protocol as described herein may include early termination of processing of the packet after determining that the receiving device is not the intended recipient of the data in the packet. Early termination of packets by the receiving device may include the receiving device terminating or exiting processing of the packet after extracting some information from the preamble of the packet, such as BSS color and TXOP, without e.g., processing and error checking a remainder of the packet or its preamble.

Accordingly, some implementations described herein format preambles of packets of a later protocol with preambles that at least partially imitate or otherwise at least partially look like preambles of an earlier protocol. The preambles according to both protocols may have some bits that are independent of protocol, e.g., bits that are common to both protocols. The bits that are independent of protocol may include information, such as BSS color and TXOP, that may be understandable by and useful to devices that implement either of the protocols. The preambles according to both protocols may also have some bits that are dependent on the protocol, e.g., bits that are different depending on the protocol and, at least in the case of the later protocol, may not be meaningful or understandable to devices that implement the earlier protocol. The bits that are dependent on the protocol may implement features that, at least in the case of the later protocol, may not be supported by devices that implement the earlier protocol.

In an example implementation, the earlier protocol is the IEEE 802.11ax communication protocol and the preamble of packets according to the later protocol at least partially imitates the preamble of the HE TB PPDU. When an IEEE 802.11ax wireless device receives a packet that at least looks like a trigger-based packet and that is not preceded at the wireless device by a trigger frame, the wireless device may still extract BSS color and TXOP from the wireless packet, e.g., to use in one or more algorithms. Since the wireless device did not receive the trigger frame preceding the wireless packet, it knows that the wireless packet is not intended for the wireless device and information therein apart from the BSS color and TXOP may not be meaningful or useful to the wireless device. As such, the wireless device may cleanly exit processing of the wireless packet without further processing, which may reduce power consumption and/or reduce or eliminate a possibility of the wireless device detecting an error. Other bits in the preamble may be used for features of the later protocol without interfering with operation (e.g., potentially causing an error condition) of the wireless device.

Referring to FIG. 3, the EHT PPDUs are examples of packets according to a later protocol and the HE PPDUs are examples of packets according to an earlier protocol. The format of the preambles of the EHT PPDUs may at least partially imitate the preamble of at least one of the HE PPDUs, specifically the HE TB PPDU. In particular, the length field of the L-SIG of the legacy preamble of the EHT PPDUs may be set to mod(LENGTH, 3)=1, which as indicated previously designates an HE SU PPDU or HE TB PPDU for wireless devices that implement the IEEE 802.11ax protocol. In addition, two bits in the U-SIG1 field of the EHT PPDUs that correspond to the two reserved bits in the HE-SIG-A1 field of the HE TB PPDU may be set to values of 0 and 1, which as indicated previously designate the PPDU as an HE TB PPDU for wireless devices that implement the IEEE 802.11ax protocol. Further, each of the EHT PPDUs of FIG. 3 may include BSS color and TXOP at bit locations of the U-SIG1 and U-SIG2 that correspond to bit locations of BSS color and TXOP of the HE-SIG-A1 and HE-SIG-A2. Accordingly, when an IEEE 802.11ax wireless device receives one of the EHT PPDUs of FIG. 3 so configured, it may process it as an HE TB PPDU that it did not request, including extracting the BSS color and TXOP notwithstanding the IEEE 802.11ax wireless device not understanding the preamble fields 302, 304 of the EHT PPDUs that are specific to the later protocol.

Figure 4:
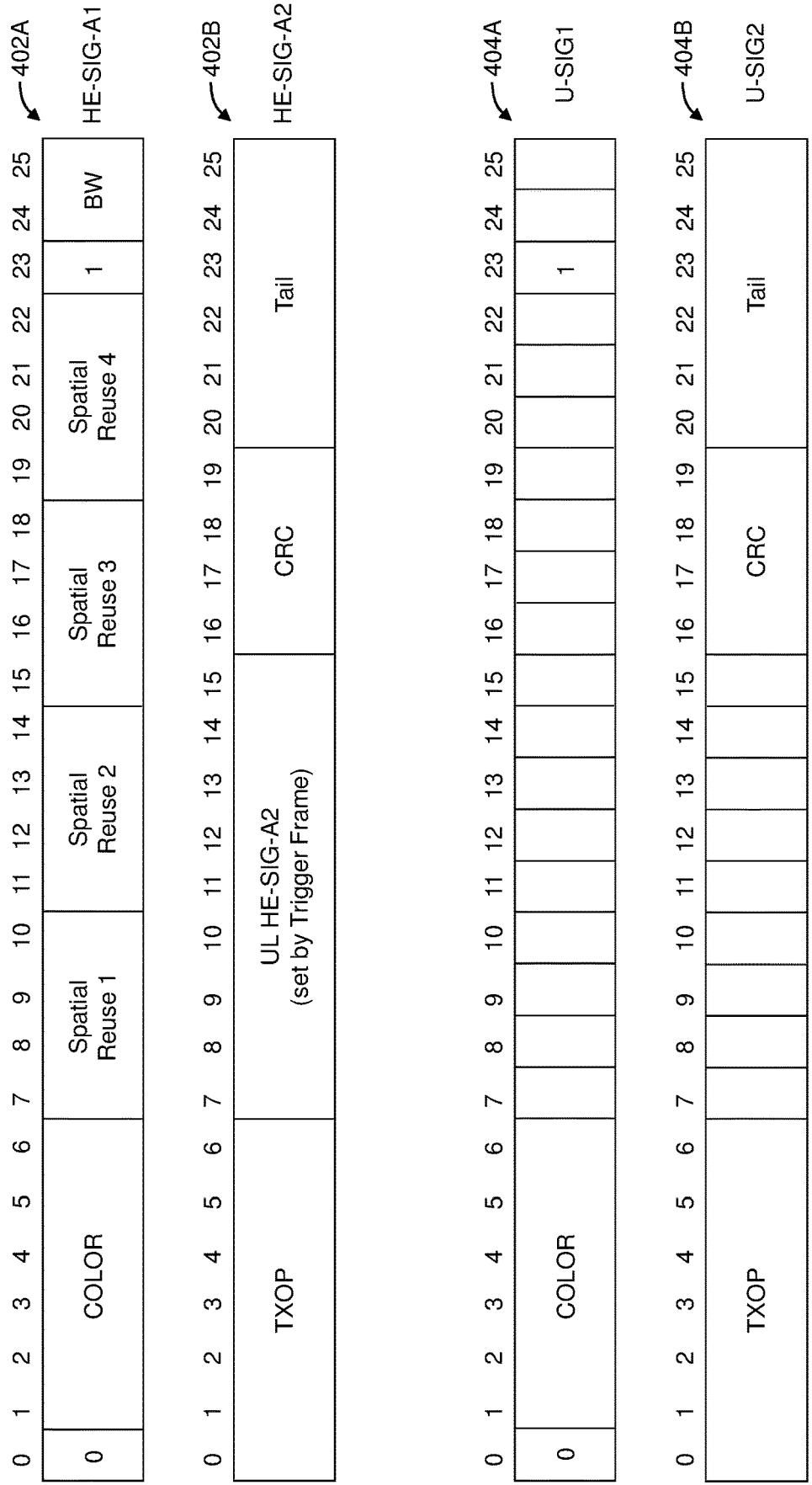
FIG. 4 illustrates example preamble fields of earlier and later protocols according to at least one implementation.

FIG. 4 illustrates example preamble fields 402A, 402B, 404A, 404B of earlier and later protocols according to at least one implementation. In the example of FIG. 4, the preamble fields 404A, 404B of the later protocol may be configured to at least partially imitate the preamble fields 402A, 402B of the earlier protocol.

As illustrated, the preamble fields 402A, 402B of the earlier protocol respectively include the HE-SIG-A1 and HE-SIG-A2 fields of the HE TB PPDU of FIG. 3.

In the illustrated example in which the preamble field 402A is the HE-SIG-A1 field, the preamble field 402A includes two reserved bits in the 1st and 24th bit positions, with the first reserved bit in the 1st bit position having a value of 0 and the second reserved bit in the 24th bit position having a value of 1. As described elsewhere, the first and second reserved bits having values of 0 and 1, in combination with a length field of a preceding L-SIG being set to mod(LENGTH, 3)=1, identify a corresponding PPDU carrying the preamble field 402A and the preceding L-SIG as a trigger-based packet, e.g., as an HE TB PPDU. The preamble field 402A additionally includes BSS color in the 2nd through 7th bit positions, spatial reuse fields in the 8th through 23rd bit positions, and a bandwidth (BW) field in the 25th through 26th bit positions.

In the illustrated example in which the preamble field 402B is the HE-SIG-A2 field, the preamble field 402B includes TXOP in the 1st through 7th bit positions, uplink (UL) HE-SIG-A2 values in the 8th through 16th bit positions that are set by the trigger frame that triggered the corresponding HE TB PPDU of which the preamble field 402B is a part, a cyclic redundancy check (CRC) in the 17th through 20th bit positions, and a tail in the 21st through 26th bit positions.

As illustrated, the preamble fields 404A, 404B of the later protocol respectively include the U-SIG1 and USIG-2 fields of the EHT PPDUs of FIG. 3. More generally, the preamble fields 404A, 404B of the later protocol may include fields that at least partially imitate corresponding fields of the earlier protocol.

In the illustrated example in which the preamble field 404A is the U-SIG1 field, the preamble field 404A includes two reserved bits in the 1st and 24th bit positions, with the first reserved bit in the 1st bit position having a value of 0 and the second reserved bit in the 24th position having a value of 1, similar to the preamble field 402A of the earlier protocol. Inclusion of the first and second reserved bits having values of 0 and 1 at the 1st and 24th bit positions in the preamble field 404A, in combination with a length field of a preceding L-SIG being set to mod(LENGTH, 3)=1, causes a corresponding PPDU carrying the preamble field 404A and the preceding L-SIG to imitate or look like an HE TB PPDU to IEEE 802.11ax wireless devices. The preamble field 404A additionally includes BSS color in the second through 7th bit positions, similar to the preamble field 402A. As such, the BSS color may be extracted from the preamble field 402A by IEEE 802.11ax wireless devices despite the corresponding PPDU implementing the later protocol with other fields that the IEEE 802.11ax wireless device may not understand. The 8th through 23rd and 25th through 26th bit positions of the preamble field 404A may be used for features specific to the later protocol as the IEEE 802.11ax wireless device need not understand the 8th through 23rd and 25th through 26th bit positions of the preamble field 404A in the absence of a corresponding preceding trigger frame.

In the illustrated example in which the preamble field 404B is the U-SIG2 field, the preamble field 404B includes TXOP in the 1st through 7th bit positions, a CRC in the 17th through 20th bit positions, and a tail in the 21st through 26th bit positions, similar to the preamble field 402B of the earlier protocol. As such, the TXOP may be extracted from the preamble field 402B by IEEE 802.11ax wireless devices despite the corresponding PPDU implementing the later protocol with other fields that the IEEE 802.11ax wireless device may not understand. The 8th through 16th bit positions of the preamble field 404B may be used for features specific to the later protocol as the IEEE 802.11ax wireless device need not understand the 8th through 16th bit positions of the preamble field 404B in the absence of a corresponding preceding trigger frame.

Figure 5:
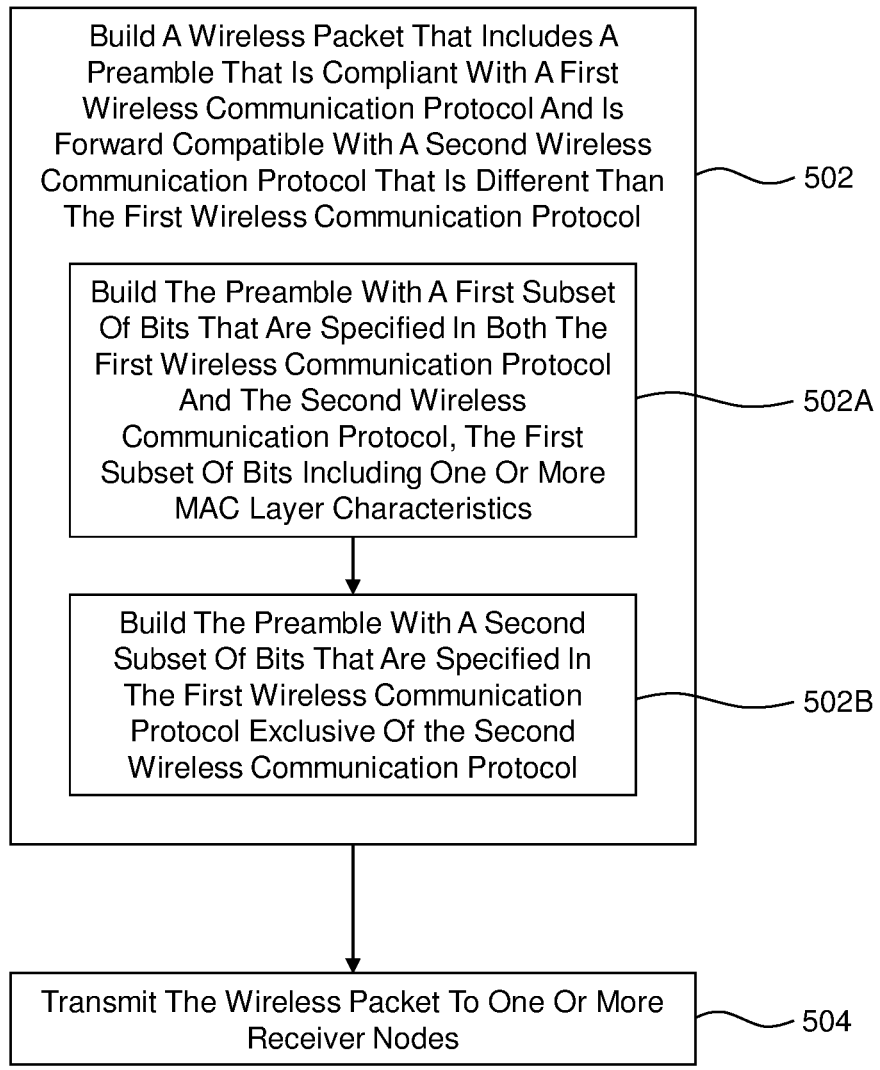
FIG. 5 illustrates a flowchart of an example method of wireless communication from the point of view of a first wireless device.

FIG. 5 illustrates a flowchart of an example method 500 of wireless communication from the point of view of a first wireless device. The first wireless device implements a first wireless communication protocol or later protocol (hereinafter "first protocol") to communicate with other wireless devices that implement the first wireless communication protocol or other wireless protocol(s). Packets sent by the first wireless device according to the method 500 may also be at least partially understandable by wireless devices that implement a second wireless communication protocol or earlier protocol (hereinafter "second protocol").

The method 500 may be performed by any suitable system, apparatus, or device. For example, one or more of the wireless devices 104, 106 of FIG. 1 or the wireless device 200 of FIG. 2 may perform or direct performance of one or more of the operations associated with the method 500. For purposes of discussion, the method 500 is discussed as being performed by the AP 104A of FIG. 1. The method 500 may include one or more of blocks 502 or 504.

At block 502, the method 500 includes building a wireless packet that includes a preamble that is compliant with the first protocol and is forward compatible with the second protocol that is different than the first protocol. In an example, block 502 may include the AP 104A building an EHT PPDU (FIG. 3) that includes a preamble that is compliant with a later protocol and is forward compatible, or at least partially understandable, by wireless devices that implement an earlier protocol.

Block 502 may include one or more of sub-blocks 502A or 502B. Sub-block 502A includes building the preamble with a first subset of bits that are specified in both the first protocol and the second protocol. The first subset of bits may thereby be independent of protocol and/or may be common to both protocols. In some implementations, the first subset of bits includes one or more MAC layer characteristics, such as one or both of BSS color or TXOP. With combined reference to FIGS. 3 and 5, building the preamble with the first subset of bits that include one or more MAC layer characteristics at sub-block 502A may include building the preamble with at least one of: a first field such as the U-SIG1 field of either of the EHT PPDUs that includes BSS color; or a second field such as the U-SIG2 field of either of the EHT PPDUs that includes TXOP.

Sub-block 502B includes building the preamble with a second subset of bits that are specified in the first protocol exclusive of the second protocol. The second subset of bits may be dependent on the second protocol and may not be meaningful or understandable to devices that implement the second (or earlier) protocol. Even so, the second subset of bits may be built to look correct to the second wireless communication protocol. For example, the second subset of bits may be built to include a same length and/or other characteristics of preamble fields or portions thereof in TB PPDUs that were not triggered by the receiver node. The second subset of bits may implement features for the first (or later) protocol that may not be supported by devices that implement the second protocol.

At block 504, the method 500 includes transmitting the wireless packet to one or more receiver nodes. The receiver nodes may include one or more wireless devices that implement the first protocol and understand both the first subset of bits and the second subset of bits in the preamble. The receiver nodes may include one or more wireless devices that implement the second protocol and understand the first subset of bits but not the second subset of bits.

In some implementations, building the wireless packet at block 502 may include building the preamble to at least partially imitate a preamble of a packet, such as a TB packet, sent in response to a request, such as a trigger frame, for the packet. Building the preamble to at least partially imitate the preamble of the packet sent in response to the request for the packet may include building the preamble with a legacy signal field (L-SIG) having a length field set to mod (LENGTH, 3)=1. Alternatively or additionally, building the preamble to at least partially imitate the preamble of the packet sent in response to the request for the packet may include building the preamble with one or more fields, such as the U-SIG1 or U-SIG2 in FIG. 3, that at least partially imitate one or more corresponding HE signal A fields (e.g., HE-SIG-A1 or HE-SIG-A2 in FIG. 3) of an HE TB packet according to the IEEE 802.11ax communication protocol. In at least one implementation, building the preamble to at least partially imitate the preamble of the packet sent in response to the request for the packet includes building the preamble with a field that includes: a first reserved bit as a 1st bit in the field, the first reserve bit having a value of 0; and a second reserved bit as a 24th bit in the field, the second reserved bit having a value of 1. Each of the first and second reserved bits may be included in the first subset of bits that are specified in both of the first and second protocols.

In some implementations, the second (or earlier) protocol is the IEEE 802.11ax communication protocol and building the wireless packet at block 502 includes building the preamble to at least partially imitate a trigger-based preamble, and more particularly the preamble of the HE TB PPDU (hereinafter the HE TB preamble) of FIG. 3 according to the IEEE 802.11ax communication protocol.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed implementations.

For example, the method 500 may additionally include receiving a second wireless packet of the first or second protocol and processing the second wireless packet accordingly. Two examples are described with respect to FIGS. 6-7. A method of each of FIG. 6 and FIG. 7 or portions thereof may be implemented individually or combined with some or all of the method 500 of FIG. 5.

Figure 6:
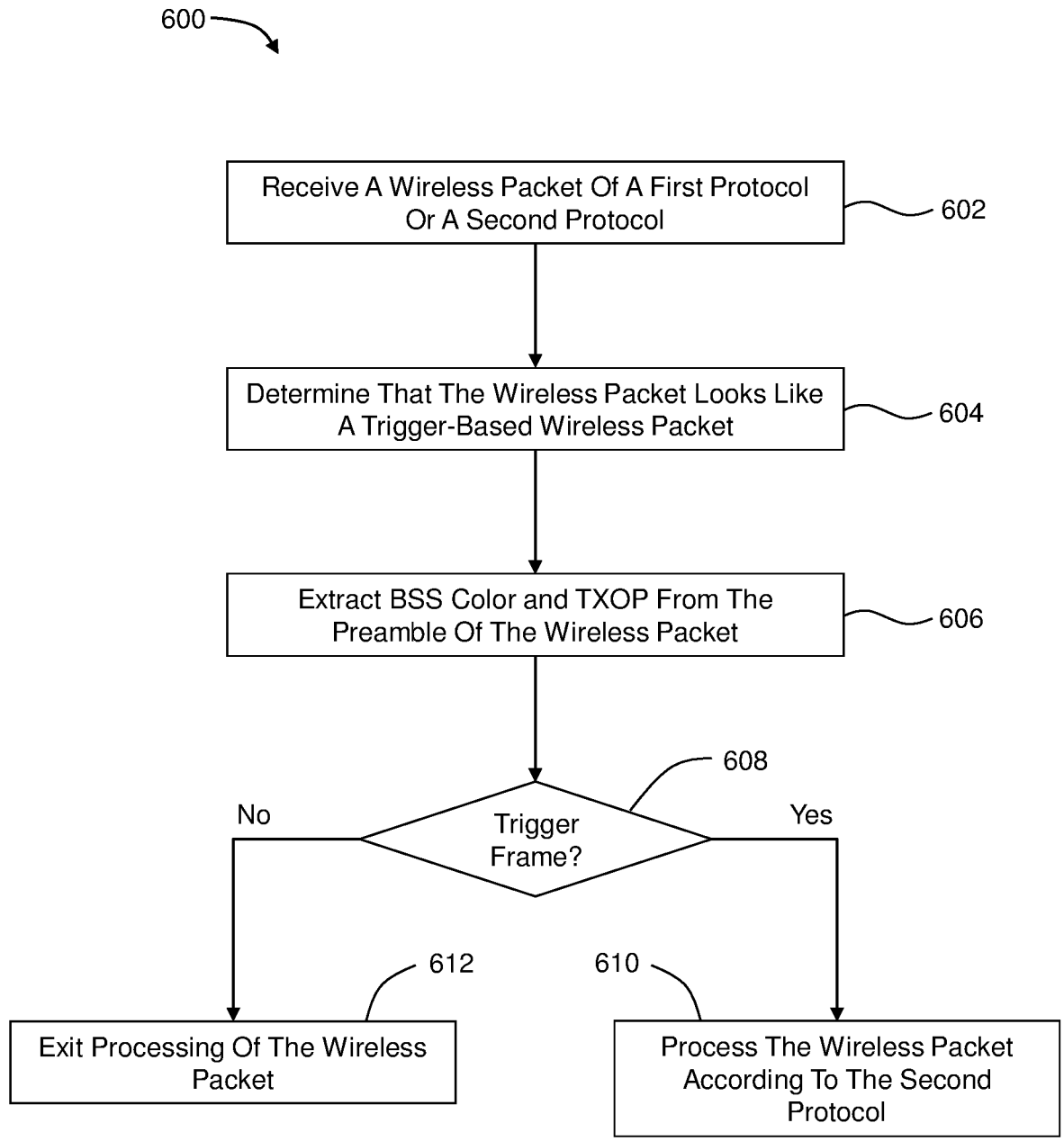
FIG. 6 illustrates a flowchart of an example method to process a wireless packet.

FIG. 6 illustrates a flowchart of an example method 600 to process a wireless packet. The wireless packet may be of a first (or later) protocol or of a second (or earlier) protocol and may be processed according to the method 600 by a wireless device that implements the second protocol.

When the second protocol is the IEEE 802.11ax communication protocol and the first protocol is a different, later protocol (such as the IEEE 802.11be communication protocol), execution of the method 600 by the wireless device may generally involve processing the wireless packet under the assumption that it is an HE TB PPDU even though the wireless packet is of the different, later protocol. The wireless device need not do anything other than what it is already programmed to do for wireless packets of the second protocol, thereby facilitating forward compatibility of the first protocol with the second protocol.

The method 600 may be performed by any suitable system, apparatus, or device. For example, one or more of the wireless devices 104, 106 of FIG. 1 or the wireless device 200 of FIG. 2 may perform or direct performance of one or more of the operations associated with the method 600. For purposes of discussion, the method 600 is discussed as being performed by the AP 104B of FIG. 1. The method 600 may include one or more of blocks 602, 604, 606, 608, 610, and/or 612.

At block 602, the AP 104B receives a wireless packet, e.g. a PPDU, of the first or second protocol. For example, the AP 104B may receive the wireless packet from any of the other APs 104 or STAs 106 in FIG. 1.

At block 604, the AP 104B determines that the wireless packet looks like a trigger-based wireless packet. Determining that the wireless packet looks like a trigger-based wireless packet may include parsing a preamble of the wireless packet and determining that a length field of L-SIG in the preamble is set to mod(LENGTH, 3)=1 and that 1st and 24th bits in HE-SIG-A1 or U-SIG1 are respectively set to 0 and 1.

At block 606, the AP 104B extracts BSS color and TXOP from the preamble of the wireless packet.

At block 608, the AP 104B determines whether it heard or detected a trigger frame preceding the wireless packet.

If the AP 104B heard or detected the trigger frame ("Yes" at block 608), at block 610 the AP 104B processes the wireless packet according to the second protocol, which may include parsing, processing, and using the spatial reuse fields in the 8th through 23rd bit positions of the preamble field 402A (FIG. 4) and/or the UL HE-SIG-A2 field in the 8th through 16th bit positions of the preamble field 402B (FIG. 4). Alternatively or additionally, processing the wireless packet according to the second protocol may include parsing and processing other preamble fields and/or data of the wireless packet following the HE-SIG-A2 field.

If the AP 104B did not hear or detect the trigger frame ("No" at block 608), at block 612 the AP 104B exits processing of the wireless packet after finishing processing of what the wireless device assumes to be HE-SIG-A1 and HE-SIG-A2 (or U-SIG1 and U-SIG2 if the wireless packet is of the first protocol).

Figure 7:
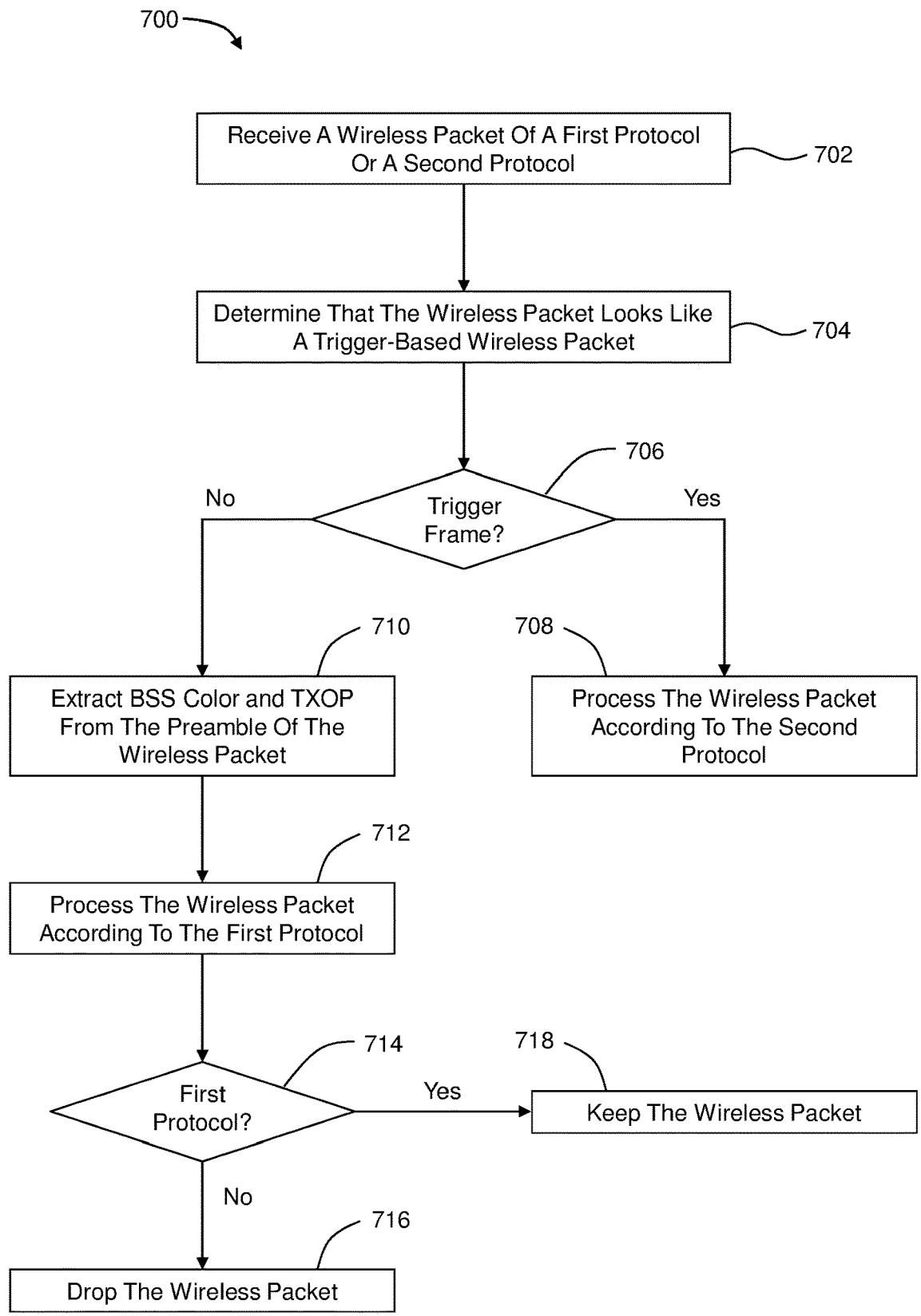
FIG. 7 illustrates a flowchart of another example method to process a wireless packet.

FIG. 7 illustrates a flowchart of another example method 700 to process a wireless packet. The wireless packet may be of a first (or later) protocol or of a second (or earlier) protocol and may be processed according to the method 700 by a wireless device that implements the first protocol.

The method 700 may be performed by any suitable system, apparatus, or device. For example, one or more of the wireless devices 104, 106 of FIG. 1 or the wireless device 200 of FIG. 2 may perform or direct performance of one or more of the operations associated with the method 700. For purposes of discussion, the method 700 is discussed as being performed by the AP 104A of FIG. 1. The method 700 may include one or more of blocks 702, 704, 706, 708, 710, 712, 714, 716, and/or 718.

At block 702, the AP 104A receives a wireless packet, e.g. a PPDU, of the first or second protocol. For example, the AP 104A may receive the wireless packet from any of the other APs 104 or STAs 106 in FIG. 1.

At block 704, the AP 104A determines that the wireless packet looks like a trigger-based wireless packet. Determining that the wireless packet looks like a trigger-based wireless packet may include parsing a preamble of the wireless packet and determining that a length field of L-SIG in the preamble is set to mod(LENGTH, 3)=1 and that 1st and 24th bits in HE-SIG-A1 or U-SIG1 are respectively set to 0 and 1.

At block 706, the AP 104A determines whether it heard or detected a trigger frame preceding the wireless packet.

If the AP 104A heard or detected the trigger frame ("Yes" at block 706), at block 708 the AP 104A processes the wireless packet according to the second protocol, which may include parsing, processing, and using the spatial reuse fields in the 8th through 23rd bit positions of the preamble field 402A (FIG. 4) and/or the UL HE-SIG-A2 field in the 8th through 17th bit positions of the preamble field 402B (FIG. 4). Alternatively or additionally, processing the wireless packet according to the second protocol may include parsing and processing other preamble fields and/or data of the wireless packet following the HE-SIG-A2 field.

If the AP 104A did not hear or detect the trigger frame ("No" at block 706), at block 710 the AP 104A extracts BSS color and TXOP from the preamble of the wireless packet.

At block 712, the AP 104A processes the wireless packet according to the first protocol, which may include parsing and processing the second subset of bits that are specified in the first protocol.

At block 714, the AP 104A confirms whether the wireless packet is a wireless packet of the first protocol. For example, if the AP 104A finds invalid values in the second subset of bits or a later part of the preamble of the wireless packet indicates an error, the AP 104A may determine that the wireless packet is not of the first protocol.

If the AP 104A determines that the wireless packet is not of the first protocol ("No" at block 714), at block 716 the AP 104A drops the wireless packet.

If the AP 104A confirms that the wireless packet is of the first protocol ("Yes" at block 714), at block 718 the AP 104A keeps the wireless packet.

Figure 8:
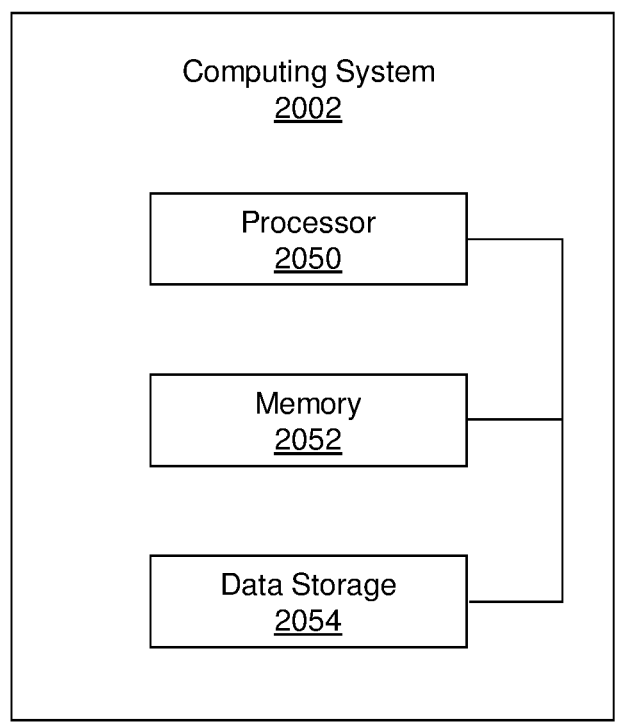
FIG. 8 illustrates a block diagram of an example computing system that may be used to perform or direct performance of one or more operations described according to at least one implementation of the present disclosure.

FIG. 8 [P,J1] illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSPs, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    building a wireless packet that includes a preamble that is compliant with a first wireless communication protocol and is forward compatible with a second wireless communication protocol that is different than the first wireless communication protocol, including:
        building the preamble with a first subset of bits that are specified in both the first wireless communication protocol and the second wireless communication protocol, the first subset of bits including one or more media access control (MAC) layer characteristics;
        building the preamble with a second subset of bits that are specified in the first wireless communication protocol exclusive of the second wireless communication protocol; and
        building the preamble to at least partially imitate a preamble of a trigger-based (TB) packet sent in response to a trigger frame of the second wireless communication protocol, including building the preamble with a field that includes:
            a first reserved bit as a first bit in the field, the first reserve bit having a value of 0 and included in the first subset of bits; and
            a second reserved bit as a twenty-fourth bit in the field, the second reserve bit having a value of 1 and included in the first subset of bits; and
    transmitting the wireless packet to one or more receiver nodes.

2. The method of claim 1, wherein building the preamble with the first subset of bits that includes one or more MAC layer characteristics comprises building the preamble with at least one of:
    a first field that includes a basic service set (BSS) color; or a second field that includes a reserved transmit opportunity (TXOP).

3. The method of claim 1, wherein building the preamble with the second subset of bits that are specified in the first wireless communication protocol exclusive of the second wireless communication protocol comprises building the second subset of bits to look correct according to the second wireless communication protocol.

4. The method of claim 1, wherein building the preamble to at least partially imitate the preamble of the packet sent in response to the trigger frame comprises building the preamble with one or more fields that at least partially imitate a high-efficiency (HE) signal A (HE-SIG-A) field of an HE TB packet according to the Institute of Electrical and Electronics Engineers (IEEE) 802.11ax communication protocol.

5. The method of claim 1, wherein the second wireless communication protocol comprises the Institute of Electrical and Electronics Engineers (IEEE) 802.11ax communication protocol and building the wireless packet comprises building the preamble to at least partially imitate a high-efficiency (HE) TB preamble according to the IEEE 802.11ax communication protocol, the method further comprising:
- receiving a second wireless packet that includes a second preamble that at least looks like an HE TB preamble;
- if an 802.11ax trigger frame is detected preceding the second wireless packet, processing the second wireless packet as an 802.11ax HE TB physical layer protocol data unit (PPDU); and
- if an 802.11ax trigger frame is not detected preceding the second wireless packet:
  - extracting a basic service set (BSS) color and a reserved transmit opportunity (TXOP) from the second wireless packet;
  - parsing the second set of bits from the second preamble;
  - if the second set of bits parsed from the second preamble includes invalid values or indicates an error, dropping the second wireless packet; and
  - if the second set of bits parsed from the second preamble includes valid values and does not indicate an error, processing the second wireless packet according to the first wireless communication protocol.

6. A non-transitory computer-readable storage medium having computer-readable instructions stored thereon that are executable by a processor device to perform or control performance of operations comprising:
- building a wireless packet that includes a preamble that is compliant with a first wireless communication protocol and is forward compatible with a second wireless communication protocol that is different than the first wireless communication protocol, including:
  - building the preamble with a first subset of bits that are specified in both the first wireless communication protocol and the second wireless communication protocol, the first subset of bits including one or more media access control (MAC) layer characteristics;
  - building the preamble with a second subset of bits that are specified in the first wireless communication protocol exclusive of the second wireless communication protocol; and
  - building the preamble to at least partially imitate a preamble of a trigger-based (TB) packet sent in response to a trigger frame of the second wireless communication protocol, including building the preamble with a field that includes:
    - a first reserved bit as a first bit in the field, the first reserve bit having a value of 0 and included in the first subset of bits; and
    - a second reserved bit as a twenty-fourth bit in the field, the second reserve bit having a value of 1 and included in the first subset of bits; and
- transmitting the wireless packet to one or more receiver nodes.

7. The non-transitory computer-readable storage medium of claim 6, wherein building the preamble with the first subset of bits that includes one or more MAC layer characteristics comprises building the preamble with at least one of:
- a first field that includes a basic service set (BSS) color; or
- a second field that includes a reserved transmit opportunity (TXOP).

8. The non-transitory computer-readable storage medium of claim 6, wherein building the preamble with the second subset of bits that are specified in the first wireless communication protocol exclusive of the second wireless communication protocol comprises building the second subset of bits to look correct according to the second wireless communication protocol.

9. The non-transitory computer-readable storage medium of claim 8, wherein building the preamble to at least partially imitate the preamble of the packet sent in response to the trigger frame comprises building the preamble with one or more fields that at least partially imitate a high-efficiency (HE) signal A (HE-SIG-A) field of an HE TB packet according to the Institute of Electrical and Electronics Engineers (IEEE) 802.11ax communication protocol.

10. The non-transitory computer-readable storage medium of claim 8, wherein the second wireless communication protocol comprises the Institute of Electrical and Electronics Engineers (IEEE) 802.11ax communication protocol and building the wireless packet comprises building the preamble to at least partially imitate a high-efficiency (HE) TB preamble according to the IEEE 802.11ax communication protocol, the operations further comprising:
- receiving a second wireless packet that includes a second preamble that at least looks like an HE TB preamble;
- if an 802.11ax trigger frame is detected preceding the second wireless packet, processing the second wireless packet as an 802.11ax HE TB physical layer protocol data unit (PPDU); and
- if an 802.11ax trigger frame is not detected preceding the second wireless packet:
  - extracting a basic service set (BSS) color and a reserved transmit opportunity (TXOP) from the second wireless packet;
  - parsing the second set of bits from the second preamble;
  - if the second set of bits parsed from the second preamble includes invalid values or indicates an error, dropping the second wireless packet; and
  - if the second set of bits parsed from the second preamble includes valid values and does not indicate an error, processing the second wireless packet according to the first wireless communication protocol.

11. A sender node for wireless communication with a receiver node in a wireless network, the sender node comprising:
- a memory; and
- a processor coupled to the memory, the processor to perform or control performance of operations comprising:

building a wireless packet that includes a preamble that is compliant with a first wireless communication protocol and is forward compatible with a second wireless communication protocol that is different than the first wireless communication protocol, including:
  building the preamble with a first subset of bits that are specified in both the first wireless communication protocol and the second wireless communication protocol, the first subset of bits including one or more media access control (MAC) layer characteristics;
  building the preamble with a second subset of bits that are specified in the first wireless communication protocol exclusive of the second wireless communication protocol; and
  building the preamble to at least partially imitate a trigger-based (TB) preamble of a packet sent in response to a trigger frame of the second wireless communication protocol, including building the preamble with a field that includes:
    a first reserved bit as a first bit in the field, the first reserve bit having a value of 0 and included in the first subset of bits; and
    a second reserved bit as a twenty-fourth bit in the field, the second reserve bit having a value of 1 and included in the first subset of bits; and
transmitting the wireless packet to one or more receiver nodes.

12. The sender node of claim 11, wherein building the preamble with the first subset of bits that includes one or more MAC layer characteristics comprises building the preamble with at least one of:
  a first field that includes a basic service set (BSS) color; or
  a second field that includes a reserved transmit opportunity (TXOP).

13. The sender node of claim 11, wherein building the preamble with the second subset of bits that are specified in the first wireless communication protocol exclusive of the second wireless communication protocol comprises building the second subset of bits to look correct according to the second wireless communication protocol.

14. The sender node of claim 11, wherein building the preamble to at least partially imitate the preamble of the packet sent in response to the trigger frame comprises building the preamble with one or more fields that at least partially imitate a high-efficiency (HE) signal A (HE-SIG-A) field of an HE TB packet according to the Institute of Electrical and Electronics Engineers (IEEE) 802.11ax communication protocol.

15. The sender node of claim 11, wherein the second wireless communication protocol comprises the Institute of Electrical and Electronics Engineers (IEEE) 802.11ax communication protocol and building the wireless packet comprises building the preamble to at least partially imitate a high-efficiency (HE) TB preamble according to the IEEE 802.11ax communication protocol, the operations further comprising:
  receiving a second wireless packet that includes a second preamble that at least looks like an HE TB preamble;
  if an 802.11ax trigger frame is detected preceding the second wireless packet, processing the second wireless packet as an 802.11ax HE TB physical layer protocol data unit (PPDU); and
  if an 802.11ax trigger frame is not detected preceding the second wireless packet:
    extracting a basic service set (BSS) color and a reserved transmit opportunity (TXOP) from the second wireless packet;
    parsing the second set of bits from the second preamble;
    if the second set of bits parsed from the second preamble includes invalid values or indicates an error, dropping the second wireless packet; and
    if the second set of bits parsed from the second preamble includes valid values and does not indicate an error, processing the second wireless packet according to the first wireless communication protocol.

* * * * *